March 7, 1961   J. A. FITZMAURICE ET AL   2,974,254
CURVE TRACER

Filed July 25, 1958                           5 Sheets-Sheet 1

INVENTOR.
John A. Fitzmaurice &
BY Eugene Blacquier

Morse & Altman
ATTORNEYS

INVENTOR.
John A. Fitzmaurice
& Eugene Blacquier
BY
Morse & Altman
ATTORNEYS

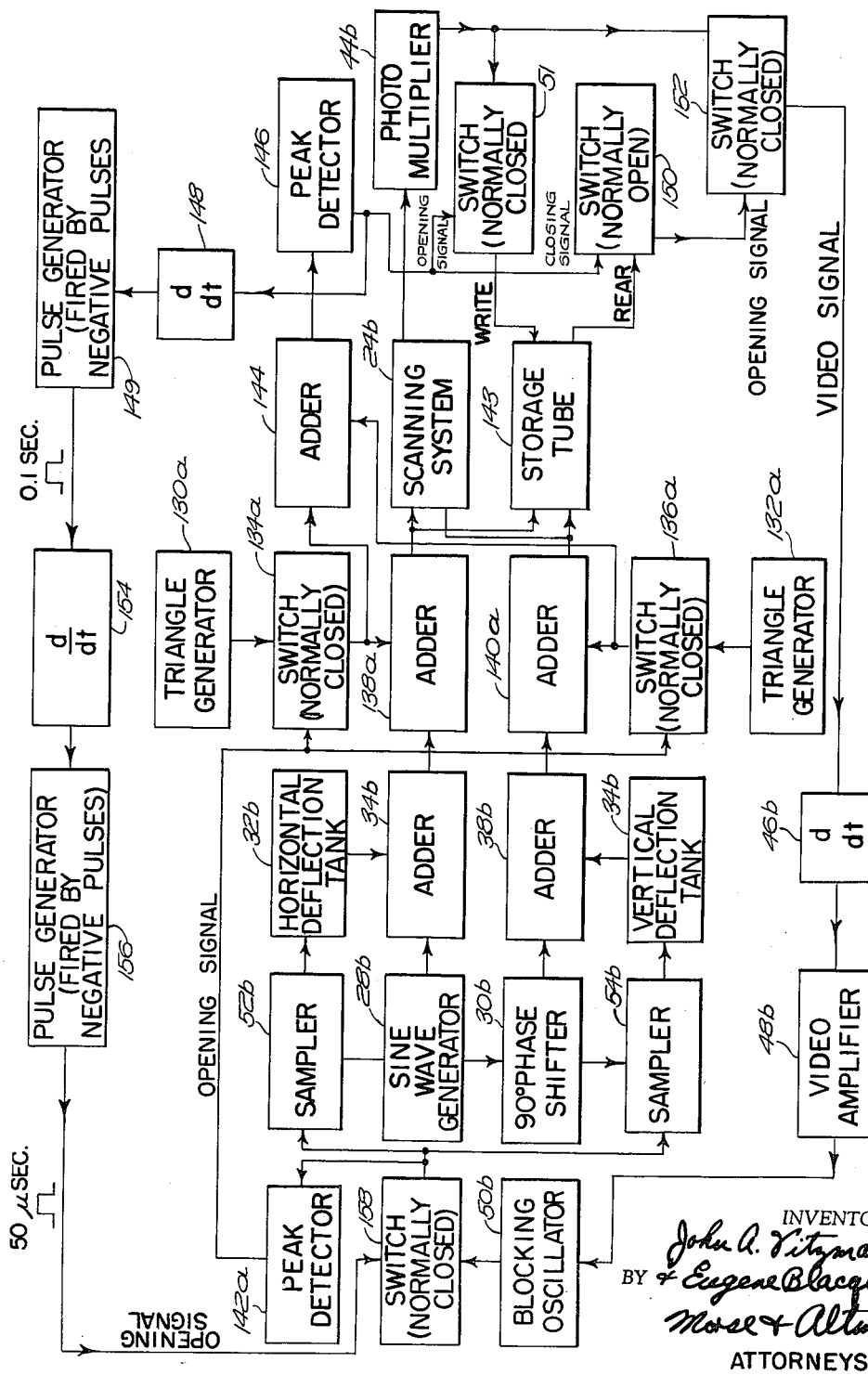

United States Patent Office 2,974,254
Patented Mar. 7, 1961

2,974,254
CURVE TRACER

John A. Fitzmaurice, Brookline, and Eugene Blacquier, Medford, Mass., assignors to Baird-Atomic, Inc., Cambridge, Mass., a corporation of Massachusetts Filed July 25, 1958, Ser. No. 750,963

9 Claims. (Cl. 315—10)

The present invention relates to curve tracing and, more particularly, to the generation of electrical signals that are related functionally to positions on a curve or curves. In such fields as high speed computing and automatic image recognition, it is frequently necessary to generate signals representing curves available on visual storage media such as paper sheets, photographic transparencies and the like. The present invention contemplates a system for automatically tracing such curves, regardless of complexity or discontinuity, in order to produce electrical representations thereof.

Primary objects of the present invention are: to provide a curve tracing system of the foregoing type characterized by scanning with a "flying spot" that traces a small pattern in response to relatively high frequency reference signals and that upon successively intersecting a curve being traced produces successive pulses in order to generate relatively low frequency correction signals of magnitudes that cause the small pattern to follow along the curve; to provide a scanning system of the foregoing type in which the repetitive pattern is a circle that is generated by a flying-spot scanner including a cathode ray tube having two sinusoidally varying voltages (e.g. 100 k.c.) 90° out of phase with each other applied to its horizontal and vertical deflectors, an objective lens system for imaging the face of the cathode ray tube and, hence, the circle on a photographic transparency bearing the curve to be traced, and a condenser lens system for imaging the entrance pupil of the objective lens system onto the light sensitive surface of a photo-detector system which tranduces the variations in light flux to variations in electrical voltage or current; and to provide a scanning system of the foregoing type in which the relatively low frequency correction signals are generated at sampling times occurring when the small circle intersects the curve and have magnitudes functionally related to the phase of the reference signals at the sampling times.

Other objects of the present invention will in part be obvious and will in part appear hereinafter.

The invention accordingly comprises the apparatus possessing the construction, combination of elements and arrangement of parts that are exemplified in the following detailed disclosure, the scope of which will be indicated in the appended claims.

For a fuller understanding of the nature and objects of the present invention, reference should be had to the following detailed description taken in connection with the accompanying drawings, wherein:

Figures 4 and 5 are block diagrams of modifications of the curve tracing system of Figure 1.

Figure 1:
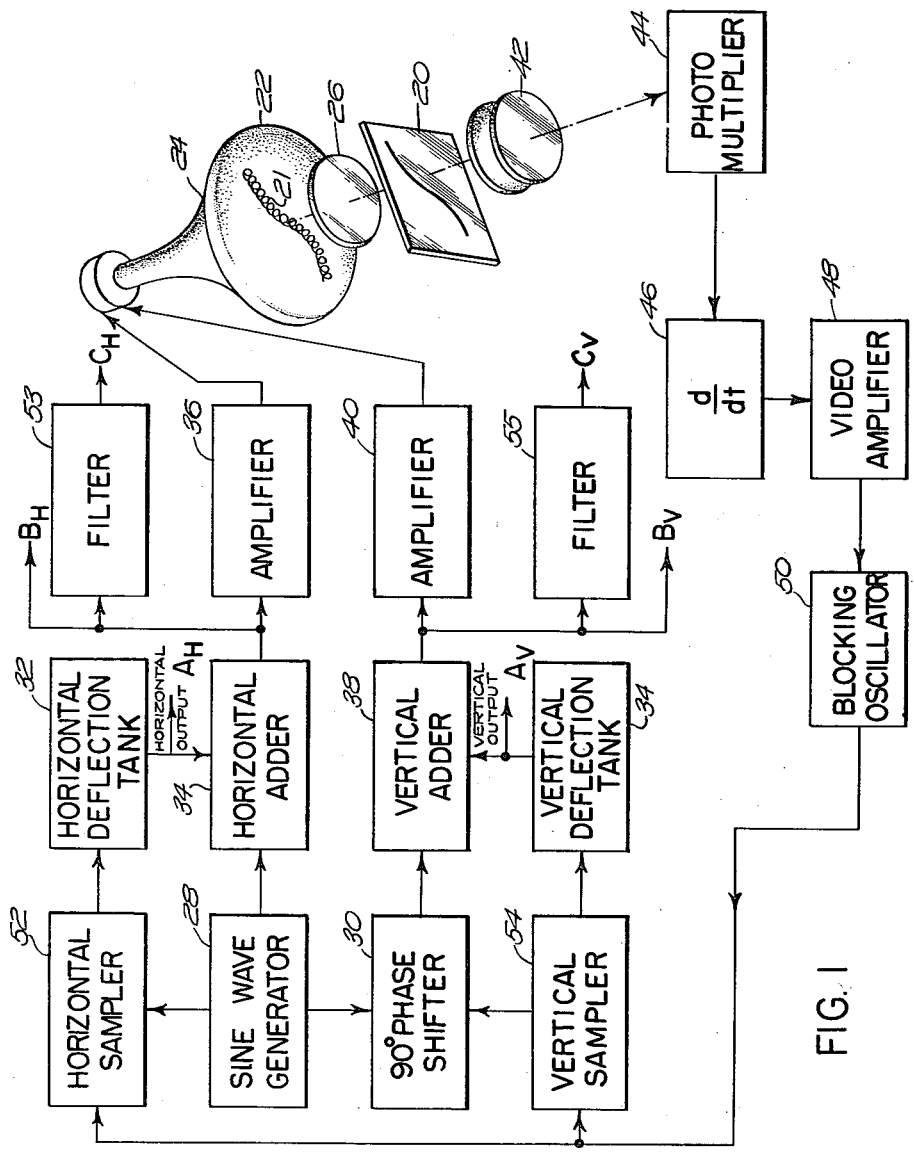
Figure 1 is a block diagram of a curve tracing system embodying the present invention.

As shown in the block diagram of Figure 1, a curve on the photographic transparency 20 is scanned by a circle 21 that is traced on face 22 of a cathode ray tube 24 and focused upon transparency 20 by an objective lens system 26. The period of circle 21 is determined by reference signals applied to the horizontal deflector plates of cathode ray tube 24 from a sine wave generator 28 and applied to the vertical deflection plates of cathode ray tube 24 from a 90° phase-shifter 30 that is energized by sine-wave generator 28. The position of circle 21 is determined by correction signals applied to the vertical deflection plates and the horizontal deflection plates, respectively, of cathode ray tube 24 by a horizontal deflection tank 32 and a vertical deflection tank 34. These correction signals are produced in a manner to be described more fully below. The horizontal reference signal from sine-wave generator 28 and the horizontal correction signal from horizontal deflection tank 32 are combined in a horizontal adder 34 and amplified in an amplifier 36 before being applied to the horizontal deflection plates of cathode ray tube 24. The vertical reference signal from 90° phase-shifter 30 and the vertical correction signal from vertical deflection tank 34 are combined in a vertical adder 38 and amplified in an amplifier 40 before being applied to the vertical deflection plates of cathode ray tube 24.

The horizontal and vertical correction signals are generated in the manner described below after the scanning circle has once intersected the curve on transparency 20. It will be apparent that the initial intersection of the scanning circle with the curve on photographic transparency 20 may be effected by manual adjustment of one of the components now to be described or automatic scanning in the manner described in connection with Figures 4 and 5. When the circle focused upon transparency 20 intersects the curve, a momentary change of transmitted light flux occurs at what may be termed a sampling time. This change of transmitted light flux is applied by a condensing lens system 42 to a photomultiplier 44. The resulting electrical output is applied by photomultiplier 44 to a differentiator 46 which in turn applies a pulse through a video amplifier 48 to a blocking oscillator 50. If the curve is displayed in the form of a narrow line, no differentiator is needed. If the curve is displayed in the form of a silhouette (e.g. on a photographic transparency in which the curve is the boundary between two curves of different transmittances), the differentiator is required. Blocking oscillator 50 applies a sharp pulse to a horizontal sampler 52, which produces a pulse whose magnitude and polarity depend on the phase of the signal generated by sine wave generator 28 at this sampling time. This pulse of given amplitude is applied by horizontal sampler 52 to horizontal deflection tank 32 for the purpose of producing a horizontal correction signal. Similarly, blocking oscillator 50 applies a pulse to a vertical sampler 54 to produce a pulse whose magnitude and polarity depend upon the phase at the sampling time of the signal produced by the 90° phase-shifter 30. This pulse of given amplitude from vertical sampler 54 is applied to vertical deflection tank 34 in order to generate a vertical correction signal.

By virtue of the low-frequency correction signal applied by horizontal deflection tank 32 and vertical deflection tank 34, scanning circle 21 tends to move in the direction of its intersection with the curve. If two error signals are produced every cycle, corresponding to the two intersections of the scanning circle with the curve 180° apart, the scanning circle will be kept centered on the curve but will not move along the curve. The circle will move along the curve if the recovery time of the blocking oscillator is made slightly greater than one-half the period of the scanning circle. Then, only every second intersection will produce an input pulse to the samplers. Both open and closed curves may be traced by the system shown in Figure 1. In the case of an open curve, the scanning circle moves along the curve, but reverses direction each time an end of the curve is reached. In the case of a closed curve the scanning circle moves along the curve continuously.

Figure 1 shows three pairs of output signals: $A_h$, $A_v$, $B_h$, $B_v$, and $C_h$, $C_v$. $A_h$, $B_h$, and $C_h$ are horizontal outputs and $A_v$, $B_v$, and $C_v$ are vertical outputs. $B_h$ and $B_v$ are outputs corresponding to the actual deflection of the flying-spot of light of cathode-ray tube 24. If outputs $B_h$ and $B_v$ are filtered through filters 53 and 55 so as to remove the frequency component corresponding to the output frequency of sine wave generator 28, resultant outputs $C_h$ and $V_v$ correspond to the actual shape of the curve being traced. $C_h$ and $C_v$ may be used to reproduce the curve on a second cathode ray tube or other two-dimensional storage medium. As an alternative to filtering out the high frequency circle, outputs $A_h$ and $A_v$ from deflection tanks 32 and 34 may be used. The choice of outputs depends upon the particular application of the system.

Figure 2:
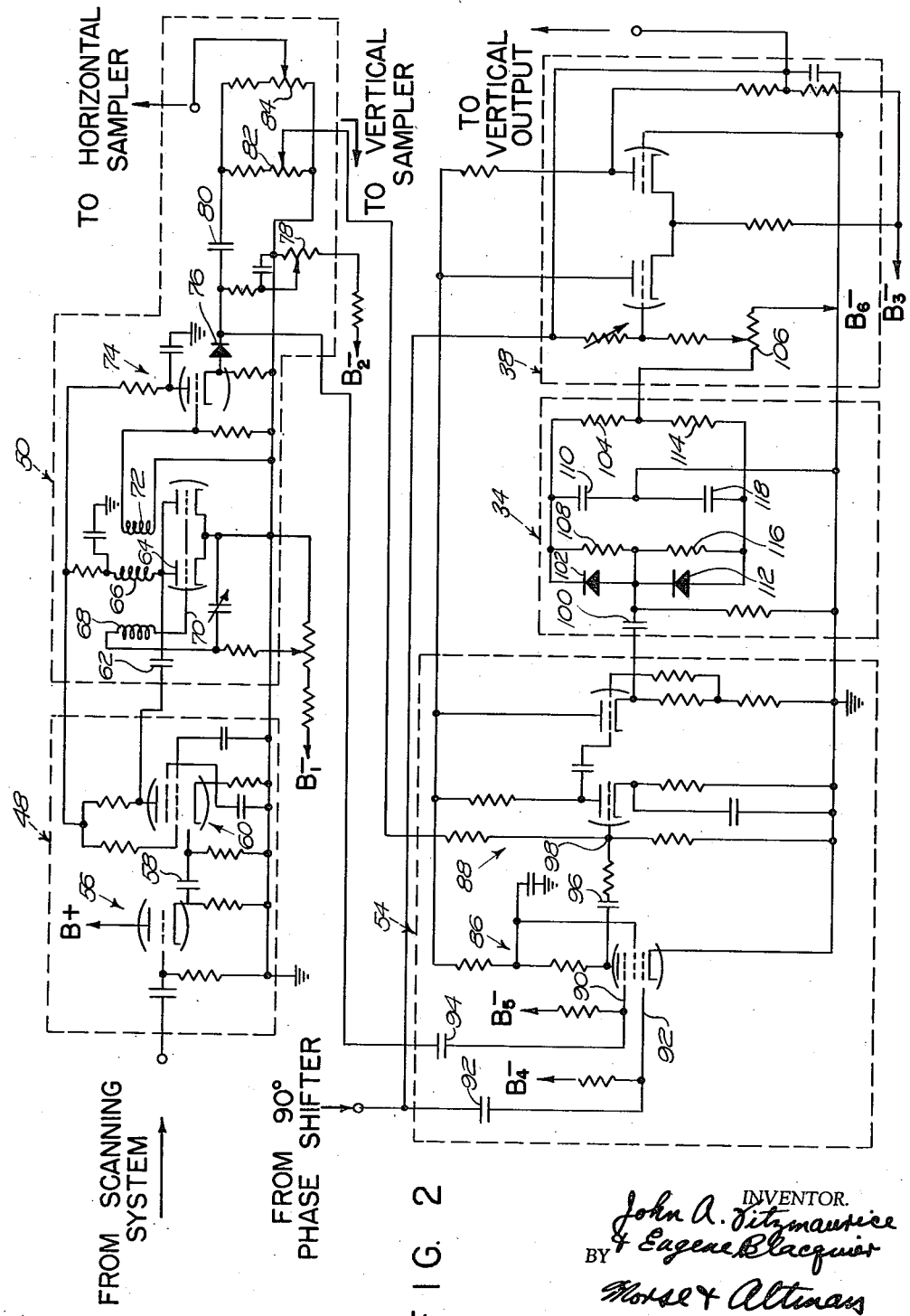
Figure 2 is a schematic diagram of critical components of the block diagram of Figure 1.

Details of the relationships among video amplifier 48, blocking oscillator 50, vertical sampler 54, vertical deflection tank 34, and vertical adder 38 are shown in Figure 2. Video amplifier 48 includes a cathode follower stage 56, serving as a low output impedance. Stage 56 is coupled through a capacitor 58 to a high fidelity pentode amplifier stage 60 which is designed to preserve the rise time of the incoming pulse.

A negative pulse from amplifier stage 60 is applied through a coupling capacitor 62 to blocking oscillator 50 which operates as follows. A plate 64 of blocking oscillator 50 is driven from its quiescent potential to a relatively low potential through an inductor 66. Inductor 66 is coupled to an inductor 68 in such a way that, in response to the negative pulse applied to plate 64, positive pulse is induced in inductor 68 in order to raise the potential of the grid 70 to which it is connected and thereby to further lower the potential of plate 64. Feedback action is terminated when grid 70 rises to a sufficiently positive value to draw grid current, at which time the potential of grid 70 returns to its quiescent potential. An inductor 72 is coupled to inductor 66 to produce a positive output pulse corresponding to the input pulse applied through inductor 66 to plate 64. The positive pulse from inductor 72 is applied to the grid of a cathode follower 74 to produce a positive output pulse. The amplitude of this pulse is determined by a clipping diode 76, which limits the pulse to an amplitude that is determined by variable resistor 78. The resulting pulse is applied through a capacitor 80 to horizontal sampler 52 and vertical sampler 54 through individually variable resistors 82 and 84.

Figure 3:
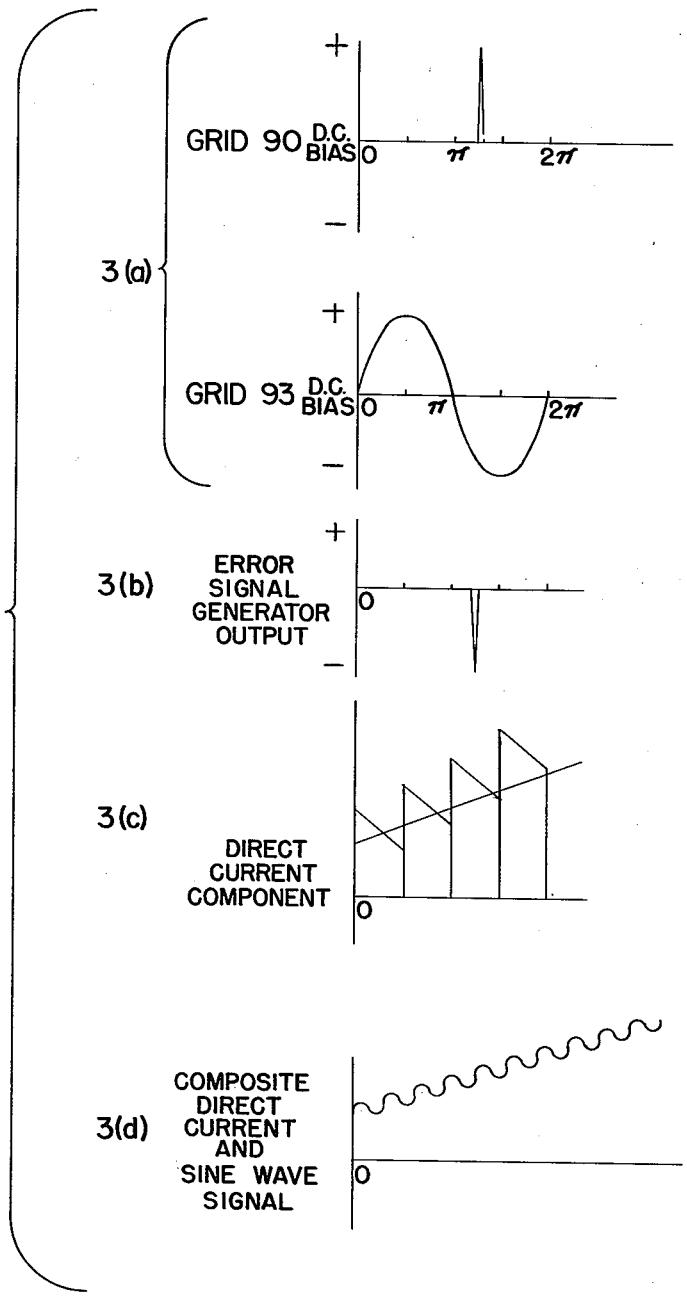
Figure 3 shows wave forms of signals generated by various components of the schematic diagram of Figure 2.

Inasmuch as horizontal sampler 52, horizontal deflection tank 32 and horizontal adder 34 are similar in all respects to vertical sampler 54, vertical deflection tank 34 and vertical adder 38, respectively, only the vertical channel need be described. Vertical sampler 54 includes a mixing stage 86 and an error signal generator 88. The output pulse of blocking oscillator 50 is applied to one of the control grids 90 of mixing stage 86 through a coupling condenser 94. The sine wave from sine wave generator 28 is applied to another control grid 93 of mixing stage 86 through a coupling capacitor 92. The mixing stage is designed so that in the absence of the signals applied to control grids 90 and 93 current flow is cut off. When signals as shown in Figure 3a are applied to their respective control grids, the result is a negative pulse the amplitude of which depends upon the position of the pulse on grid 90 in reference to the sine wave on grid 93. This output or sampling pulse is applied through a coupling capacitor 96 to the control grid 98 of error signal generator 88. Also applied to the control grid 98 of error signal generator 88 is a signal pulse from blocking oscillator 50. This signal pulse occurs at the same time as the sampling pulse. By means of variable resistor 82, this signal pulse is adjusted to an amplitude such that the error signal assumes zero amplitude when the sampling pulse occurs at the 0, $\pi$ or $2\pi$ points of sine wave from 90° phase shifter 30. As shown in Figure 3b, vertical sampler 54 produces a positive pulse if the sampling pulse occurs between the 0 and $\pi$ points of this sine wave and a negative pulse if the sampling pulse occurs between the $\pi$ and $2\pi$ points of this sine wave.

The output pulse from vertical sampler 54 is applied through a coupling capacitor 100 to vertical deflection tank 34. Vertical deflection tank 34 serves to convert the incoming pulse of selected amplitude to a direct current potential of corresponding positive or negative amplitude in the following way. Vertical deflection tank provides independent paths of long time constant for applied positive and negative pulses. A positive pulse is directed through a diode 102 and a resistor 104 to a coupling resistor 106. A resistor 108 across diode 102 and a capacitor 110 across resistor 104 and resistor 106 are chosen to render the time constant of the coupling network sufficiently long to impart a substantial direct current component of positive value to the resulting signal in the manner shown in Figure 3c. Similarly, a negative pulse is directed through a diode 112 and a resistor 114 to coupling resistor 106. A resistor 116 across diode 112 and a capacitor 118 across resistor 106 and resistor 114 are chosen to render the time of the coupling network sufficiently long to impart a substantial direct current component of negative value to the resulting signal.

The resulting direct current potential and the sine wave from the 90° phase shifter are applied to the vertical adder 38, which is provided with a second feedback stage. In the event of a gradual increase or decrease of the direct current output of deflection tank 34 in response to movement of the scanning circle along the curve, the composite signal applied to the vertical deflection plates of cathode ray tube 24 would appear as in Figure 3d.

In order that the curve tracer be completely self sufficient various features may be added to the circuit of Figure 1. First, there may be provision for an initial initial automatic search of the image for a curve before curve tracing begins. Second, after a given curve has been traced for a sufficiently long period of time to generate the function represented by the curve tracing may stop and a search may begin for other curves that may appear in the field of view.

Figure 4:
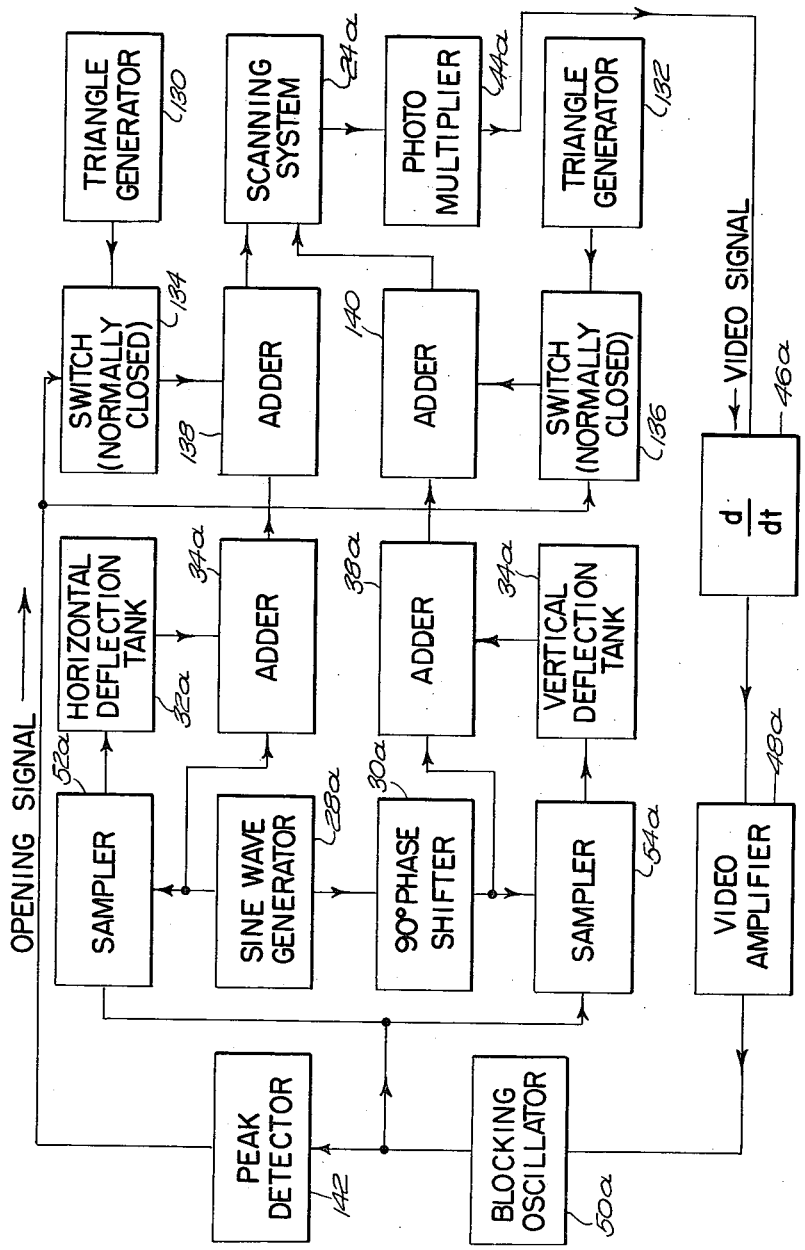

Figure 4 shows a modification incorporating an initial search feature, previously described components being designated by corresponding numerals and an "a." This modification includes two triangle generators 130 and 132 of the type which, in the absence of curve tracing would provide a pattern for scanning the complete field of view. Whenever the output of blocking oscillator 50a feeds no pulses to samplers 52a and 54a, as for example before curve tracing begins, the signals from the triangle generators are applied to the scanning system through a pair of normally closed switches 134 and 136 and a pair of adders 138 and 140. The scanning circle thereby is moved regularly in a dense pattern on the field until some curve is intersected. The resulting video pulse from blocking oscillator 50a, thereupon energized a peak detector 142 which opens switches 134 and 136. Triangle generators 130 and 132 are thereby cut out and curve tracing begins. The triangle generators may be replaced by any two signal generators that will produce a dense scanning pattern on the cathode ray tube.

A modification for tracing more than one curve in the same field of view is shown in Figure 5, previously described components of Figure 1 being designated by corresponding numerals and a "b" and previously described components of Figure 4 being designated by corresponding numerals and an "a." The deflection signals fed to the scanning system 24b simultaneously are fed to a storage tube 142. While a curve is being traced, it is recorded on storage tube 142 by a video signal. When the triangle generators are switched in during the search period, a signal from storage tube 143 simultaneously is read out in order to blank any coincident video signal. During this search period, the outputs of triangle generators 130a and 132a are fed through adders 138a and 140a and through an adder 144 to a peak detector 146. The output of peak detector 146 is fed into a differentiator 148 in order to produce a pulse at the time the search period ends and the curve tracing period begins. This pulse is applied as a timing pulse to a pulse generator 149 which measures off some interval as, for example, 1/10 second, during which it may be assumed that all desired information can be obtained from the curve. The output of peak detector 146 is also applied to a system of switches 150, 151 and 152 which control the application of the output of photomultiplier 44b to storage tube 142 and blocking oscillator 50b. The output of pulse generator 149 is applied to a differentiator 154 which at the end of the tracing interval, applies a pulse to a pulse generator 156 which generates a blanking pulse, as for example, a 50 microsecond blanking pulse that, by means of a switch 158, blanks the output of the blocking oscillator for a sufficiently long time to cause reintroduction of the search period.

Since certain changes may be made in the above apparatus without departing from the scope of the invention herein involved, it is intended that all matter contained in the above description and shown in the accompanying drawing shall be interpreted in an illustrative and not in a limiting sense.

What is claimed is:

1. A scanning system comprising first means for scanning a field containing a curve to be traced with a spot following a path, said curve enclosing at least a given area, second means for applying deflection signals to said first means, third means for applying repetitive signals to said second means such that said path intersects itself repetitively, fourth means for applying error signals to said second means, fifth means for applying magnitude signals to said fourth means in response to signals received from said first means, said third means including a sine wave generator and a 90° phase shifter.

2. A scanning system comprising first means for scanning a field containing a curve to be traced, said curve enclosing at least a given area, said first means constituting a flying spot scanner including a cathode ray tube, an objective lens system for focusing the face of said tube upon a photographic transparency having a curve to be traced, a condenser lens system for collecting light from said transparency, and a photocell for responding to light collected by said condenser lens system, second means for generating and transmitting repetitive signals to said first means, third means for generating error signals in response to pulses received from said second means and said photocell, said error signals occurring at times said pulses occur and having magnitudes that depend on the times of the phases of said repetitive signals at which said pulses occur, and fourth means for adding signals from said second means and said third means in order to apply deflection signals to said first means, said second means including a sine wave generator and a 90° phase shifter for producing sine waves that are 90° out of phase.

3. A scanning system comprising first means for scanning a field containing a curve to be traced, said curve enclosing at least a given area, said first means constituting a flying spot scanner including a cathode ray tube, an objective lens system for focusing the face of said tube upon a photographic transparency having a curve to be traced, a condenser lens system for collecting light from said transparency, and a photocell for responding to light collected by said condenser lens system, second means for generating and transmitting repetitive signals to said first means, third means for generating error signals in response to pulses received from said second means and said photocell, said error signals occurring at times said pulses occur and having magnitudes that depend on the times of the phases of said repetitive signals at which said pulses occur, and fourth means for adding signals from said second means and said third means in order to apply deflection signals to said first means, said third means including a vertical sampling stage for mixing the sine wave from said sine wave generator and the pulse from said photocell and a horizontal sampling stage for mixing the sine wave from said phase shifter and the pulse from said photocell.

4. The scanning system of claim 3, wherein said third means includes a vertical tank circuit for converting the output of said vertical sampling stage to direct current of corresponding magnitude and a horizontal sampling stage to direct current of corresponding magnitude.

5. The scanning system of claim 4, wherein said fourth means includes a vertical adder for mixing the sine wave from said sine wave generator and the direct current from said vertical tank circuit and a horizontal adder for mixing the sine wave from said phase shifter and the direct current from said horizontal tank circuit.

6. A scanning system comprising first means for scanning a field containing a curve to be traced, said first means constituting a flying spot scanner including a cathode ray tube, an objective lens system for focusing the face of said tube upon a photographic transparency having a curve to be traced, a condenser lens system for collecting light from said transparency, and a photocell for responding to light collected by said condenser lens system, second means for generating and transmitting repetitive signals to said first means, third means for generating error signals in response to pulses received from said second means and said photocell, said error signals occurring at times said pulses occur and having magnitudes that depend on the times of the phases of said repetitive signals at which said pulses occur, and fourth means for adding signals from said second means and said third means in order to apply deflection signals to said first means, said second means including a sine wave generator and at 90° phase shifter for producing sine waves that are 90° out of phase, said third means including a vertical sampling stage for mixing the sine wave from said sine wave generator and the pulse from said photocell and a horizontal sampling stage for mixing the sine wave from said phase shifter and the pulse from said photocell, said third means including a vertical tank circuit for converting the output of said vertical sampling stage to direct current of corresponding magnitude and a horizontal sampling stage to a direct current of corresponding magnitude, said fourth means including a vertical adder for mixing the sine wave from said sine wave generator and the direct current from said vertical tank circuit and a horizontal adder for mixing the sine wave from said phase shifter and the direct current from said horizontal tank circuit, said deflection signals including horizontal deflection signals and vertical deflection signals.

7. A scanning system comprising first means for scanning a field containing a curve to be traced with a spot following a path, second means for applying at least a pair of synchronized deflection signals to said first means, third means for applying at least a pair of synchronized repetitive signals to said second means such that said path intersects itself repetitively, fourth means for applying at least a pair of synchronized error signals to said second means, fifth means for applying at least a pair of synchronized magnitude signals to said fourth means in response to at least a pair of synchronized signals received from said first means.

8. A scanning system comprising first means for scanning a field containing a curve to be traced, said first means constituting a flying spot scanner including a cathode ray tube, an objective lens system for focusing the face of said tube upon a surface having a curve to be traced, a condenser lens system for collecting light from said transparency, and a photocell for responding to light collected by said condenser lens system, second means for generating and transmitting repetitive signals to said first means, third means for generating error signals in response to pulses received from said second means and said photocell, said error signals occurring at times said pulses occur and having magnitudes that depend on the times of the phases of said repetitive signals at which said pulses occur, and fourth means for adding signals from said second means and said third means in order to apply deflection signals to said first means.

9. The scanning system of claim 8, wherein said second means includes means for generating at least two sine waves that are out of phase.

References Cited in the file of this patent

UNITED STATES PATENTS

| | | |
|---|---|---|
| 2,804,498 | Theile | Aug. 27, 1957 |
| 2,816,246 | Bliss | Dec. 10, 1957 |
| 2,868,993 | Henry | Jan. 13, 1959 |
| 2,906,819 | Smith | Sept. 29, 1959 |